(12) United States Patent
Konrad et al.

(10) Patent No.: US 6,736,102 B2
(45) Date of Patent: May 18, 2004

(54) METHOD FOR OPERATING AN INTERNAL COMBUSTION ENGINE AND CORRESPONDING ARRANGEMENT

(75) Inventors: Johann Konrad, Tamm (DE); Martin Haussmann, Sachsenheim (DE); Harry Friedmann, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/111,654
(22) PCT Filed: Jun. 20, 2001
(86) PCT No.: PCT/DE01/02284
§ 371 (c)(1), (2), (4) Date: Sep. 3, 2002
(87) PCT Pub. No.: WO02/16764
PCT Pub. Date: Feb. 28, 2002

(65) Prior Publication Data
US 2003/0106521 A1 Jun. 12, 2003

(51) Int. Cl.$^7$ .................................................. F02P 9/00
(52) U.S. Cl. .................. 123/295; 123/406.29; 123/618; 123/652; 123/609; 123/406.6
(58) Field of Search .................... 123/406.29, 406.33, 123/406.38, 406.39, 406.58, 406.6, 406.65, 618, 652, 609, 295, 443

(56) References Cited

U.S. PATENT DOCUMENTS

| | | | | |
|---|---|---|---|---|
| 3,908,616 A | * | 9/1975 | Sasayama ................ | 123/406.6 |
| 4,082,069 A | * | 4/1978 | Mayer .................... | 123/406.63 |
| 4,305,370 A | * | 12/1981 | Hohne .................... | 123/406.59 |
| 4,378,778 A | * | 4/1983 | Harter ..................... | 123/406.6 |
| 5,007,397 A | * | 4/1991 | Akasu .................... | 123/406.51 |
| 6,431,145 B1 | * | 8/2002 | Denz et al. ............. | 123/406.24 |
| 6,571,783 B1 | * | 6/2003 | Denz et al. .................. | 123/609 |
| 6,595,192 B1 | * | 7/2003 | Haussmann et al. ........ | 123/609 |

FOREIGN PATENT DOCUMENTS

| | | |
|---|---|---|
| DE | 29 40 086 | 4/1981 |
| DE | 39 38 257 | 5/1990 |
| DE | 295 14 125 | 1/1997 |
| DE | 197 21 070 | 12/1997 |
| DE | 199 06 390 | 8/2000 |
| DE | 199 12 770 | 9/2000 |

* cited by examiner

Primary Examiner—Mahmoud Gimie
Assistant Examiner—Hai H Huynh
(74) Attorney, Agent, or Firm—Kenyon & Kenyon

(57) ABSTRACT

A method for operating an internal combustion engine and a corresponding device are described, in which reference pulses are generated synchronously with respect to the cyclical movement of at least one part of the internal combustion engine. At least one event moment for the occurrence of at least one event is calculated by an output unit at specific, definitively preset time intervals of the cyclical movement. Moreover, an independent clock-pulse generator is provided which generates clock pulses, the interval of the clock pulses being independent of the movement, and the interval of the clock pulses being smaller than the interval of the reference pulses. The at least one event moment is expressed as the number of clock pulses of the independent clock-pulse generator, and the at least one event is triggered upon reaching the number of clock pulses. By observing the clock pulses of the independent clock-pulse generator counted between at least two successive reference pulses, a relationship value is formed which contains information about the future timing of the movement, this relationship value being used to alter the number of clock pulses.

28 Claims, 2 Drawing Sheets ated number of clock pulses may remain unaltered in this case. In order to be able to observe the dynamics of the internal combustion engine long in advance, or to be able to ensure long dwell periods, it may be required that the event moments for a specific number of cylinders be calculated in a cylinder-individual manner.

METHOD FOR OPERATING AN INTERNAL COMBUSTION ENGINE AND CORRESPONDING ARRANGEMENT

FIELD OF INVENTION

The present invention relates to a method for operating an internal combustion engine, as well as to a corresponding device.

BACKGROUND INFORMATION

The German Published Patent Application No. 199 12 770 describes a method and a corresponding device for operating an internal combustion engine, the setpoint value for the dwell period of a controllable switch of an ignition device being expressed as the number of clock pulses of a clock-pulse generator, the clock pulses being generated independently of the movement of the crankshaft. The ignition is triggered after reaching the calculated number of clock pulses.

Furthermore, the German Published Patent Application No. 199 06 390, describes a method and a corresponding device for operating an internal combustion engine, differentiation being made between two output modes. Firstly, in the ignition-angle output mode, the moment of ignition is output in such a manner that the calculated ignition angle is honored. Secondly, in the charging-time output mode, an ignition is triggered when a specific charging time of the ignition coil has elapsed.

SUMMARY OF THE INVENTION

In contrast, an example method of the present invention and a corresponding example device according to the invention may take into consideration, after calculating the setpoint values, the dynamics of the internal combustion engine as well. The internal combustion engine may operate closer to time happenings, and thus may avoid errors developing due to the dynamics. Moreover, it may be ensured that, for example, even if a trigger wheel sensor malfunctions, at least the events associated with the setpoint values already calculated are output in any case.

Further developments and improvements of the example method specified or of the example device may be permitted. The pulse counter may be initialized after each reference pulse, since an adaptation to a new dynamic of the internal combustion engine may thus occur in a simple manner. Moreover, event moments may be calculated in a cylinder-individual manner, since the cylinders may have different properties. Setpoint values may be independently calculated as a function of operating parameters and operating modes with the aid of a control unit separate from an output unit, since the computing capacity of the ECU (electronic control unit) may thereby be utilized. For an optimal realization of the ignition of an internal combustion engine, a moment at which the controllable switch is closed and a moment of ignition or a dwell-period duration may be calculated, or, in the case of a pulse pull-ignition, the number of sparks in a spark band, a recharge time or a break time may be used as setpoint values. To achieve a proper allocation of the processes in the internal combustion engine timewise, the setpoint values may be relayed in their time sequence to the output unit. Thus, long dwell periods may be recognized early and output reliably. The events to be controlled in the internal combustion engine may be configured as a function of operating parameters, since the state of the internal combustion engine may be imaged as precisely as possible. Moreover, various operating modes may be differentiated to represent different states of the internal combustion engine as accurately as possible. In a further example embodiment, the operating mode may be held constant over at least two segments, since undesirable transitions from one operating mode to the next may thereby be avoided. If the number of clock pulses that may pass by until a specific event is very small or negative, then the speed of the control may not be sufficient to trigger the event in time. Therefore, the calcu- According to a further example refinement of the invention, provision may be made in the output unit for storage units whose contents are dependent on the triggering of the events. A success-bit storage location may be provided which has a first value when an event has ended, and has a second value when the event has been calculated once more in a new cycle. The successful completion of the process of the internal combustion engine may be monitored, and false triggerings may be forestalled as long as no new value has yet been calculated for a new cycle. If a new setpoint value is not calculated, this may not be monitored as long as the event has not been triggered. An activity-bit storage location may be introduced which has a first value when the beginning of an event has been triggered, and has a second value when the end of the event has been reached. Based on this activity bit, it may be monitored that no new setpoint values are loaded and calculated during the course of the event. For certain processes in the internal combustion engine, it may be determined, with the aid of the activity bit, how long an event lasts and/or how many cylinders are performing this event simultaneously. In this context, in response to an overly long duration of an event, e.g., a charging of an ignition coil is lasting too long, a disturbance may be recognized and this event may be triggered, i.e., the charging of the ignition coil is ended.

DETAILED DESCRIPTION

Figure 1:
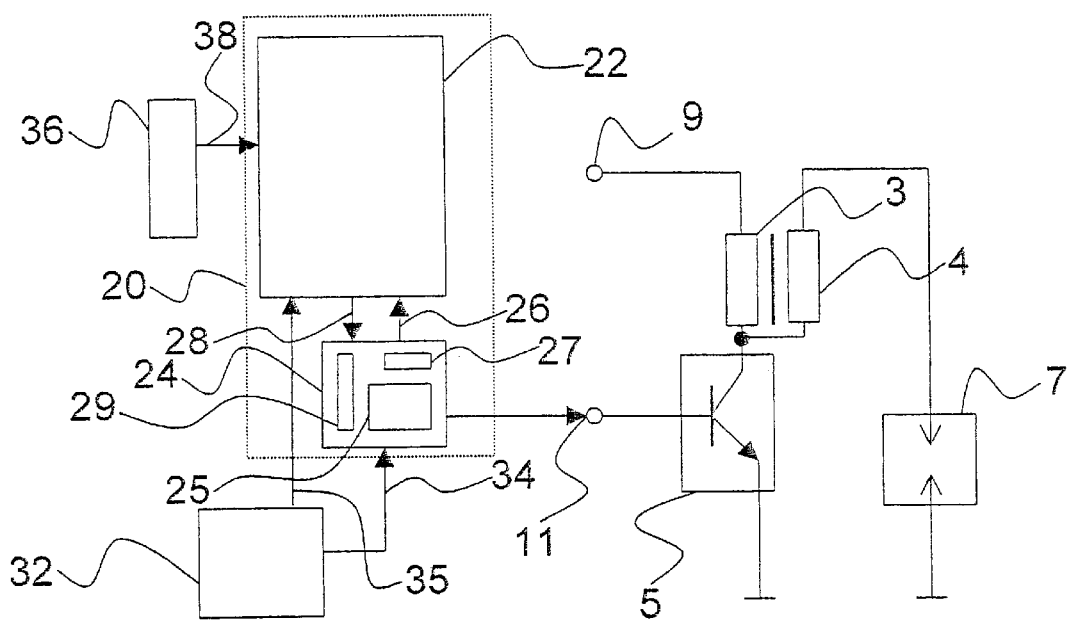
FIG. 1 shows an example device of the present invention for operating an internal combustion engine.

FIG. 1 shows schematically an example device of the present invention for controlling an internal combustion engine, particularly for igniting an internal combustion engine. The example device in FIG. 1 has an ignition coil which includes a primary coil 3 and a secondary coil 4. Primary coil 3 is connected at its one end to a battery voltage terminal 9. The other end of primary coil 3 is connected to an ignition driver stage 5 which contains a controllable switch, e.g. a transistor. Furthermore, the other end of primary coil 3 is connected to the one end of secondary coil 4. The other end of secondary coil 4 is connected to a first electrode of a spark plug 7. The second electrode of spark plug 7 is connected to ground. Ignition driver stage 5 is also connected to ground. Ignition driver stage 5 has a controllable input 11 that is connected to ECU 20, ECU 20 transmitting to controllable input 11, signals which lead to the triggering of the ignition. For example, in response to the transmission of a first signal from ECU 20 to controllable input 11 of ignition driver stage 5, the controllable switch is closed and a current flows through primary coil 3. If ECU 20 transmits a second signal, then the controllable switch is opened again, and the flow of current through primary coil 3 is interrupted. The result is that in secondary coil 4, a voltage is induced which generates an ignition spark in spark plug 7.

In one example embodiment, ECU 20 has a control unit 22 and an output unit 24 which exchange data via connections 26 and 28. Output unit 24 is connected directly to input 11 of controllable switch 5. Signals may be relayed via this connection from output unit 24 to driver stage 5. The internal combustion engine may also have at its crankshaft, a toothed wheel having a defined number of teeth. A trigger wheel sensor 32 detects the occurrence of gaps between the teeth of the trigger wheel, and relays a signal via connection 34 to output unit 24 when a tooth gap has been detected by trigger wheel sensor 32. Analogous thereto, a pulse is likewise relayed to control unit 22 via connection 35 when a tooth gap has been detected by trigger wheel sensor 32. Furthermore, the internal combustion engine has sensors 36 which monitor various operating parameters of the internal combustion engine. For the sake of simplicity, the plurality of sensors represented here by a small box 36. Operating parameters which are monitored by sensors 36 may be, for example, the temperature of the outside air, the coolant temperature, the temperature in the intake tract, the position of the throttle valve, the presence of an exhaust-gas recirculation, a knock control, the load state and/or the engine speed. The information about the operating parameters ascertained by sensors 36 is relayed via connection 38 to control unit 22.

Output unit 24 contains an independent clock-pulse generator 25 which generates pulses independently of the processes in the internal combustion engine, i.e., independently of the movements proceeding in the internal combustion engine. Furthermore, output unit 24 has a pulse counter 27 which counts pulses of independent clock-pulse generator 25. Output unit 24 also contains a storage unit 29 in which values may be stored. All the components of the output unit are interconnected and are able to exchange and/or retrieve data.

Figure 2:
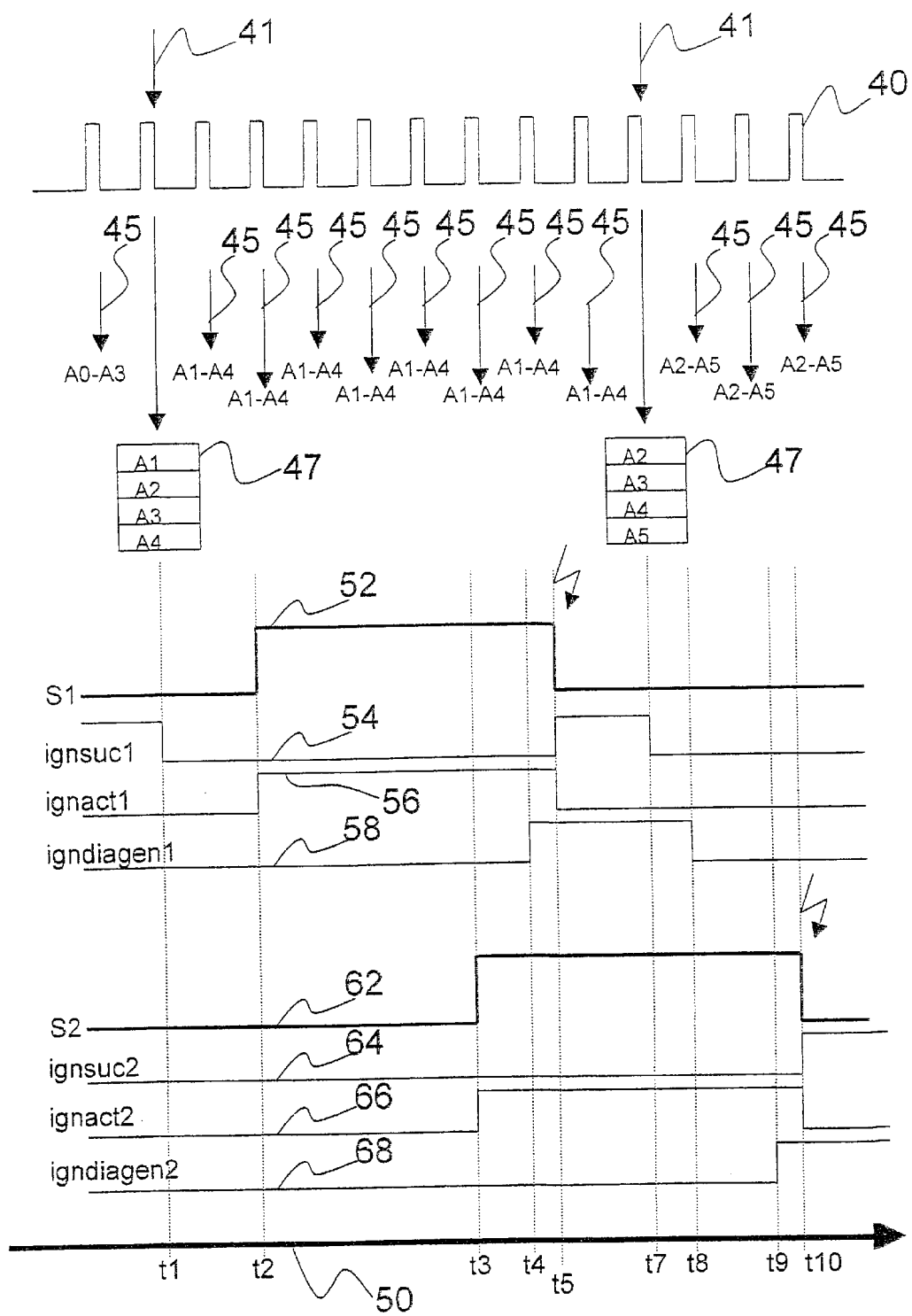
FIG. 2 shows a schematic representation of a time sequence of the reference pulses, signals and values, present in the internal combustion engine, which are available in a storage unit of an output unit of an example device according to the present invention for operating the internal combustion engine.

An example method of the present invention for operating an internal combustion engine is explained with reference to FIG. 2. All signal sequences plotted over the X-axis in FIG. 2 are time-dependent, i.e., the time is plotted on the X-axis. Pulse sequence 40 is a pulse sequence as trigger wheel sensor 32 relays it via connections 34 and 35, respectively, to output unit 24 and control unit 22. This pulse sequence 40 contains information about what rotational angle the crankshaft is exhibiting.

At specific, definitively preset intervals, e.g. at a crank angle of 72° before top dead center of each cylinder, control unit 22 triggers by a signal 41 at a moment t1 or t7 that the data of sensors 36 are being scanned by control unit 22. According to the data of the sensors, at moments t1 and t7, respectively, control unit 22 calculates setpoint values for specific events which should occur in the future in the internal combustion engine. Such setpoint values for the event "ignition" may be, for example, the crank angle at which the controllable switch of driver stage 5 is closed, the ignition angle and the time duration in which the controllable switch of driver stage 5 should be closed (dwell period). If the ignition proceeds in the form of a pulse pull-ignition, setpoint values such as the number of sparks in a spark band, the recharge angle and the break time are calculated. Moreover, for the event "injection", setpoint values such as the injection quantity, the injection angle or the injection duration may also be calculated. These or other setpoint values for future events in the internal combustion engine, as well—other than the previously indicated events may also be taken into account in this context—are calculated by control unit 22 as a function of operating modes which are selected dependent on the information from sensors 36. Operating modes such as operation during the start phase, dynamic operation, normal operation (partial load), idling operation and/or full load operation may be differentiated. These operating modes may be conventional for the operation of internal combustion engines and are therefore not further clarified here.

In an example embodiment, these setpoint values are calculated cylinder-individually, the setpoint values, for example, being calculated simultaneously for a plurality of cylinders, the events proceeding in the cylinders one after the other. For example, in the case of a 4-cylinder internal combustion engine, the ignition occurs first in the first cylinder, then in the second cylinder, after that in the third cylinder and then in the fourth cylinder, etc. These setpoint values are subsequently relayed in the corresponding time sequence via connection 28 to output unit 24, the setpoint values at this point of time not yet being allocated to a specific cylinder. In FIG. 2, the delivery of the setpoint values to output unit 24 is represented schematically by tables 47 which contain setpoint values A1, A2, A3 and A4 for an event in time sequence, e.g. the ignition-angle setpoint values.

Output unit 24 now links the setpoint values to the corresponding cylinders in which the events associated with the setpoint values are to occur. Thus, to refer back to the example cited above, A1 is then a setpoint value for the ignition in cylinder 1, A2 is a setpoint value for the ignition in cylinder 2, A3 is a setpoint value for the ignition in cylinder 3 and A4 is a setpoint value for the ignition in cylinder 4. After the delivery of the setpoint values to output unit 24 and the allocation to the cylinders, event moments which result from the setpoint values are calculated from the setpoint values. For example, from the setpoint value for the ignition angle of the first cylinder, a moment of ignition, i.e. a moment at which the controllable switch of ignition driver stage 5 should be opened again, is ascertained. From this, output unit 24 calculates the number of pulses which may be required to be awaited from independent clock-pulse generator 25 from the calculation moment until the event moment. These pulses are counted by pulse counter 27, and when a comparison unit, contained in output unit 24, establishes the agreement of the number of pulses counted by pulse counter 27 with the number of calculated pulses, a signal is generated which results in output unit 24 transmitting, for example, to controllable input 11 of driver stage 5, a signal for interrupting the flow of current through the primary coil. A sequence of such signals S1 and S2 is shown in FIG. 2 by curves 52 and 62. At moment t2, a first signal is transmitted to controllable input 11 of ignition driver stage 5, so that current flows through primary coil 3; and at a moment t5, a second signal is transmitted to controllable input 11 of ignition driver stage 5, so that the flow of current through primary coil 3 is interrupted. This initiates an ignition in spark plug 7, which is indicated here by a lightning symbol. In the case of signal sequence S2 of curve 62, the flow of current through primary coil 3 begins at moment t3, and the flow of current through primary coil 3 ends at moment t10.

The setpoint values are only calculated at moments t1 and t7, respectively, i.e. at specific, definitively preset crankshaft angles. However, because of the dynamics of the internal combustion engine, between the moments of calculating the setpoint values, a change may occur in the movement of the internal combustion engine compared to the previously calculated relationships. An intention is to take this into account in the example method presented here. To that end, signal sequence 40, which is yielded from the crankshaft signal, is utilized. Each pulse, relayed from trigger wheel sensor 32 to output unit 24, is designated as reference pulse 45. At the moment of each reference pulse 45, output unit 24 ascertains the number of clock pulses of independent clock-pulse generator 25 between two previously registered reference pulses 45. From this number and a comparison of the number to one or more previously ascertained numbers of clock pulses, conclusions may be drawn about the dynamics of the internal combustion engine. Accordingly, a relationship value is calculated, so that event moments A1 through A4 and A2 through A5, respectively, calculated at moments t1 and t7, respectively, are in each case adapted according to this change. To then obtain a correct comparison between the calculated number of clock pulses and the clock pulses of independent clock-pulse generator 25, pulse counter 27 is re-initialized at the moment of each reference pulse 45. In this method, even in the event of the loss or malfunction of the trigger wheel sensor, i.e., when reference pulses 45 are no longer present, events still following may be output, since independent clock-pulse generator 25, together with pulse counter 27, may ensure an output of the calculated event moments, independently of the trigger wheel sensor.

Alternatively, the example method may also be performed in such a manner that the clock pulses are adapted, for example, at each second reference pulse 45. However, a prerequisite for the functioning of the method may be that the clock pulses of independent clock-pulse generator 25 are output at markedly smaller intervals than reference pulses 45. Furthermore, reference pulses 45 may have perceptibly smaller intervals than pulses 41 at which the setpoint values are calculated.

In certain situations, it may occur that the number of clock pulses calculated at a reference pulse 45 up to the occurrence of an event moment is very small, i.e., because of the dynamics, the event should already have occurred in the past, and thus a negative number was ascertained. This occurs, for example, when the internal combustion engine has experienced a sharp acceleration. For safety reasons, when the number of clock pulses is smaller than a specific threshold value, the value for the clock pulses is not updated and the previously calculated value is retained. Thus, at any rate, the event is triggered.

In one example embodiment, the output unit is able to differentiate two output modes, the ignition-angle output mode and the charge-time output mode. In the ignition-angle output mode, as described above, the number of clock pulses to be awaited until the opening of the controllable switch of ignition driver stage 5 is updated at each reference pulse 45. In the charge-time output mode, after the controllable switch of ignition driver stage 5 has been closed, i.e. the charge time has begun, the number of clock pulses to be awaited is no longer updated. This may ensure that exactly the calculated dwell period is output which is needed to make an energy sufficient for the ignition available in the ignition coil. Thus, the power loss may be minimized.

In the case of certain operating modes, it may be required that the setpoint-value calculation from one moment of the setpoint-value calculation to the next moment of the setpoint-value calculation not change back and forth quickly between different operating modes. This may be the case for internal combustion engines which work with direct gasoline injection. Such internal combustion engines may be operated using the same method described above. Homogenous operation, homogenous/lean operation and stratified operation may be defined here as possible operating modes. These operating modes may be conventional in the case of direct gasoline injection, and therefore shall not be further clarified here. To avoid undesirable switching back and forth between two operating modes, attention is given here when calculating the setpoint value that the setpoint-value calculation is based on the same operating mode over at least two setpoint-value calculation time intervals, which are also called segments.

In a further example embodiment, the device for operating an internal combustion engine includes in output unit 24, a storage unit 29 which contains values for each cylinder and for each event, the contents of the respective storage location of the corresponding cylinder being scanned prior to triggering the event, and the triggering of the event being influenced as a function of the contents of the storage location. Furthermore, the contents of the corresponding storage location may also be altered by the triggering of events.

For example, for each cylinder and each event, storage unit 29 contains a so-called success-bit storage location ignsuc1 for the first cylinder, ignsuc2 for the second cylinder. The contents of these storage locations are represented in FIG. 2 in terms of curves 54 and 64, respectively. At the beginning of the observations, storage location ignsuc1 contains the value 1. On the basis of the calculation of a new setpoint value, at moment t1, the value of this success-bit storage location is set to zero. Upon conclusion of a process, i.e., here in response to the output of the signal for the opening of the controllable switch of ignition driver stage 5 at moment t5, the success-bit storage location of the first cylinder is set to the value 1. After the calculation of a new setpoint value at moment t7, the success-bit storage location is again set to the value zero. The method may also be performed correspondingly with complementary values, i.e., the success-bit storage location may have the value zero whenever the output of the signal for opening the controllable switch takes place, and upon calculation of a new setpoint value, may be changed to the value 1.

In the output unit, the value of this success-bit storage location may now be scanned before a new ignition process is initiated. If the success-bit storage location of the cylinder in question still contains the value 1, that is to say, the ignition was performed and no new setpoint value has yet been loaded, then it is not plausible that a new ignition is performed. Consequently, for this case, the closing of the controllable switch of the ignition driver stage is not implemented. This plausibility conflict is signaled to the fault management of ECU 20.

Moreover, in one example embodiment, storage unit 29 contains a so-called activity-bit storage location for each cylinder and each event. The values which an activity-bit storage location has for the first and the second cylinder are represented in FIG. 2 by curves 56 and 66, and are designated by ignact1 and ignact2. As long as the ignition process is not initiated, the activity-bit storage location has the value 0. If the charging of the ignition coil, i.e. the flow of current through primary coil 3 is begun, then the value 1 is allocated to the activity-bit storage location, and upon triggering of the end of the flow of current through the primary coil, the value 0 is allocated to the activity-bit storage location of the respective cylinder. Thus, during the charging of the ignition coil, the activity-bit storage location has the value 1, and otherwise the value 0. In this context, it may also be configured that the activity-bit storage location has the value 0 during the charging of the ignition coil, and otherwise the value 1.

During the charging of the ignition coil of the respective cylinder, it may not be sensible that new setpoint values for the event "ignition" be loaded. Therefore, the loading of new setpoint values for moment t1 or t7 is suppressed when the activity-bit storage location has the value 1 for the cylinder in question. In a further example embodiment, for the charge-time output mode, based on the value stored at the activity-bit storage location of the respective cylinder, it may be deduced whether a charging of the ignition coil is occuring. For example, when the activity-bit storage location has the value 1, output unit 24 is prohibited from updating the number of clock pulses to be awaited until the opening of the controllable switch. In a further example embodiment, based on the time duration over which the activity-bit storage location of a cylinder has a value 1, it may be ascertained how long the charge time lasts. If the charge time exceeds a threshold value, then the charging of the ignition coil is lasting an implausibly long time, and a forced ignition is initiated. Moreover, from the contents of the activity-bit storage locations, it may be ascertained how many ignition coils are in the "charge" state simultaneously.

In a further example embodiment, a diagnostic-bit storage location may also be provided in storage unit 29 for each cylinder. The value of such a diagnostic-bit storage location for a first and second cylinder, respectively, is represented in FIG. 2 in terms of curves 58 and 68. At a specific moment prior to triggering the ending of the charging of the ignition coil at moment t5, the diagnostic-bit storage location of the respective cylinder is allocated a value 1, and at a specific time after the triggering of the end of the charging of the ignition coil, the diagnostic-bit storage location is allocated a value 0. For example, for the first cylinder represented in FIG. 2, this may occur at a moment t4 and t8. For the second cylinder, the diagnostic-bit storage location is set to the value 1 at moment t9.

During the time in which the diagnostic-bit storage location has the value 1, the diagnosis, that is to say, for example, the checking of hardware and software functions for the respective cylinder is enabled. Here, values are requested of diagnostic components and are processed in ECU 20. It may thereby be ensured that the diagnostic is run for the correct cylinder in each case, and thus the values applicable for the cylinder in question are processed.

In a further example embodiment, such storage locations are also provided analogously for each cylinder for the event "injection" and other events controlled by the method described above.

What is claimed is:

1. A method for operating an internal combustion engine, comprising:
   generating reference pulses synchronously with respect to a cyclical movement of at least one part of the internal combustion engine;
   calculating at least one event moment for an occurrence of at least one event with an aid of an output unit at specific, definitively preset intervals of the cyclical movement;
   generating clock pulses with an aid of an independent clock-pulse generator of the output unit, the clock pulses having an interval that is independent of the cyclical movement and smaller than an interval of the reference pulses;
   expressing the at least one event moment as a number of the clock pulses;
   triggering the at least one event upon reaching the number of clock pulses counted by a pulse counter;
   forming a relationship value containing information about a future time sequence of the cyclical movement in accordance with clock pulses counted between at least two successive reference pulses; and
   altering the number of the clock pulses in accordance with the relationship value.

2. The method according to claim 1, further comprising:
   initializing the pulse counter at each reference pulse; and
   recalculating the number of the clock pulses up to the at least one event moment in accordance with the relationship value.

3. The method according claim 1, wherein the at least one event moment is calculated cylinder-individually if there is a plurality of cylinders.

4. The method according to claim 3, wherein the at least one event moment is calculated cylinder-individually at the specific, definitively preset intervals of the cyclical movement simultaneously for a specific, definitively preset number of cylinders.

5. The method according to claim 1, further comprising:
   determining at least one setpoint value of the internal combustion engine by a control unit as a function of at least one operating parameter and at least one operating mode with reference to characteristic curves stored in a control unit, the at least one setpoint value being transferred by the control unit to the output unit,
   wherein the at least one event moment is calculated by the output unit from the at least one setpoint value.

6. The method according to claim 5, wherein the at least one setpoint value includes one of an ignition angle, an angle at which a controllable switch is closed, a dwell-period duration, a number of sparks in a spark band, a recharge angle, and a break time.

7. The method according to claim 5, further comprising:
   transferring the at least one setpoint value to the output unit in a time sequence if the internal combustion engine has a plurality of cylinders; and
   allocating the at least one setpoint value to cylinders passing through an ignition top dead center in the time sequence, the allocating being performed by the output unit and occurring prior to calculating the at least one event moment.

8. The method according to claim 5, further comprising:
   scanning, as operating parameters, at least one temperature and at least one of a position of a throttle valve, a presence of an exhaust-gas recirculation, a knock signal, a load signal, and an engine speed; and
   differentiating at least one first operating mode with reference to one of a moment after a start of the internal combustion engine, an engine speed, and engine-speed dynamics, the at least one first operating mode including an operation in a start phase, a dynamic operation, a normal operation, an idling operation, and a full-load operation; and
   differentiating at least one second operating mode with reference to a direct gasoline injection, the at least one second operating mode including a homogeneous operation, a homogeneous/lean combustion operation, and a stratified operation, the at least one first operating mode being combinable with the at least one second operating mode.

9. The method according to claim 8, wherein the at least one temperature includes an outside air temperature, a coolant temperature, and an intake temperature.

10. The method according to claim 5, wherein the at least one operating mode used for calculating the at least one setpoint value is not altered over a duration of at least two specific intervals of the cyclical movement.

11. The method according to claim 1, wherein the cyclical movement is a movement of a crankshaft and the specific, definitively preset intervals of the cyclical movement are intervals of a specific, definitively preset angular position of the crankshaft before an ignition top dead center.

12. The method according to claim 1, wherein a number of clock pulses previously calculated is not altered if a number of clock pulses calculated at a reference pulse is smaller than a first threshold value.

13. The method according to claim 1, further comprising:
scanning contents of at least one storage location of the output unit prior to a triggering of at least one event corresponding to a specific cylinder of the internal combustion engine, the contents corresponding to the at least one event corresponding to the specific cylinder, the at least one storage location containing one of a first value and a second value for each cylinder of the internal combustion engine and for each event; and
at least one of influencing the triggering of the at least one event corresponding to the specific cylinder as a function of the contents of the at least one storage location, and altering the contents of the at least one storage location based on the triggering of the at least one event corresponding to the specific cylinder.

14. The method according to claim 13, wherein the at least one event corresponding to the specific cylinder includes at least a beginning of a process and an end of the process, and the at least one event moment includes an event beginning moment and an event ending moment.

15. The method according to claim 14, wherein the at least one event corresponding to the specific cylinder includes a beginning of a dwell period and an end of the dwell period.

16. The method according to claim 14, wherein the at least one event moment includes a dwell-period beginning moment and a dwell-period ending moment.

17. The method according to claim 14, further comprising:
setting a success-bit storage location to a first value upon a triggering of a specific end event corresponding to a specific cylinder, the success-bit storage location corresponding to the specific end event; and
setting the success-bit storage location to a second value by calculating a new, at least one event moment for the specific end event at the specific, definitively preset intervals.

18. The method according to claim 17, wherein the specific end event is not triggered as long as the success-bit storage location has a first value.

19. The method according to claim 14, further comprising:
setting an activity-bit storage location corresponding to a specific event for a specific cylinder to a first value upon a triggering of a beginning of the specific event for the specific cylinder; and
setting the activity-bit storage location to a second value upon a triggering of an end of the specific event for the specific cylinder.

20. The method according to claim 19, wherein no new setpoint values are calculated for the specific event and the specific cylinder as long as the activity-bit storage location corresponding to the specific event for the specific cylinder has a first value.

21. The method according to claim 19, further comprising:
ascertaining at least one of a sum of cylinders whose activity-bit storage location is set to the first value, a number of reference pulses of a cylinder, a number of intervals of the cyclical movement during which the activity-bit storage location of the specific cylinder retains the first value unchanged.

22. A device for operating an internal combustion engine, comprising:
a sensor unit to synchronously generate reference pulses with respect to a cyclical movement of at least one part of the internal combustion engine;
an independent clock-pulse generator to generate clock pulses whose intervals are independent of the movement and smaller than the intervals of the reference pulses;
a pulse counter to count the clock pulses; and
an output unit to calculate at least one event moment for an occurrence of at least one event at specific, definitively preset intervals of the cyclical movement, the output unit configured to aid in expressing the at least one event moment as a number of clock pulses generated by the independent clock-pulse generator, the output unit arranged to include the independent clock-pulse generator, the output unit further configured to aid in triggering the at least one event upon reaching a number of the clock pulses counted by the pulse counter, the output unit further configured to form a relationship value that is observable from clock pulses counted between two successive reference pulses, the relationship value containing information about a future time sequence of the cyclical movement, the output unit further configured to alter the number of clock pulses using the relationship value.

23. The device according to claim 22, wherein the pulse counter is able to be initialized at each reference pulse, and the number of clock pulses up to the at least one event moment is able to be recalculated using the relationship value.

24. The device according to claim 22, wherein the at least one event moment is able to be calculated cylinder-individually by the output unit if there is a plurality of cylinders.

25. The device according to claim 22, further comprising:
a first connection; and
a control unit to determine at least one setpoint value of the internal combustion engine as a function of at least one operating parameter and at least one operating mode on a basis of characteristic curves stored in the control unit, the at least one setpoint value being transferable from the control unit to the output unit via the first connection, wherein the output unit is further configured to calculate the at least one event moment from the at least one setpoint value.

26. The device according to claim 25, further comprising:

a second connection; and at least one sensor to detect the at least one operating parameter, a value of the at least one operating parameter being transferable from the at least one sensor via the second connection to the control unit.

27. The device according to claim 26, wherein at least one of a temperature of an outside air, a coolant temperature, a temperature of an intake tract, a position of a throttle valve, a presence of an exhaust-gas recirculation, a knock signal, a load signal, and an engine speed is able to be scanned as the at least one operating parameter.

28. The device according to claim 22, wherein the output unit includes a storage unit having at least one storage location to contain one of a first value and a second value for each cylinder of the internal combustion engine and for each event, the at least one storage location including contents corresponding to a specific cylinder, the contents being scannable prior to a triggering of the at least one event for the specific cylinder, and one of the triggering of the at least one event for the specific cylinder being influenced as a function of the contents and the contents being alterable based on the triggering of the at least one event for the specific cylinder.

* * * * *